United States Patent [19]

Chu

[11] Patent Number: 5,490,335
[45] Date of Patent: Feb. 13, 1996

[54] INSIDE AND OUTSIDE DIAMETER MEASURING GAUGE

[76] Inventor: George H. Chu, 111 156th Ave. NE., Bellevue, Wash. 98007

[21] Appl. No.: 278,249

[22] Filed: Jul. 21, 1994

[51] Int. Cl.⁶ ............................................. G01B 5/08
[52] U.S. Cl. .................... 33/810; 33/784; 33/792
[58] Field of Search ............... 33/459, 460, 461, 33/462, 464, 555.1, 542, 783, 784, 792, 793, 794, 795, 796, 809, 810, 811, 812

[56] References Cited

U.S. PATENT DOCUMENTS

| | | | |
|---|---|---|---|
| 1,007,400 | 10/1911 | Speer | 33/812 |
| 1,253,096 | 1/1918 | Preston | 33/461 |
| 2,518,128 | 8/1950 | Dufilho | 33/809 |
| 3,287,812 | 11/1966 | Smith | 33/796 |
| 4,058,900 | 11/1977 | Yandell | 33/199 R |
| 4,063,362 | 12/1977 | Amsbury et al. | 33/795 |
| 4,188,727 | 2/1980 | Matui | 33/796 |
| 4,711,037 | 12/1987 | Saadat | 33/543 |

*Primary Examiner*—William A. Cuchlinski, Jr.
*Assistant Examiner*—G. Bradley Bennett

[57] ABSTRACT

A measuring gauge for measuring both inside and outside diameters. The inventive device includes a main body having a plurality of extension members telescopingly received therein which may be extended therefrom to various lengths. The device further includes a pair of pivotally mounted OD legs operable to engage the outside surfaces of an object being measured, and a pair of pivotally mounted ID legs operable to engage the interior surfaces of the measured object. The OD legs and the ID legs are aligned such that indicia provided along the device can be used for both inside and outside measuring operations.

12 Claims, 4 Drawing Sheets

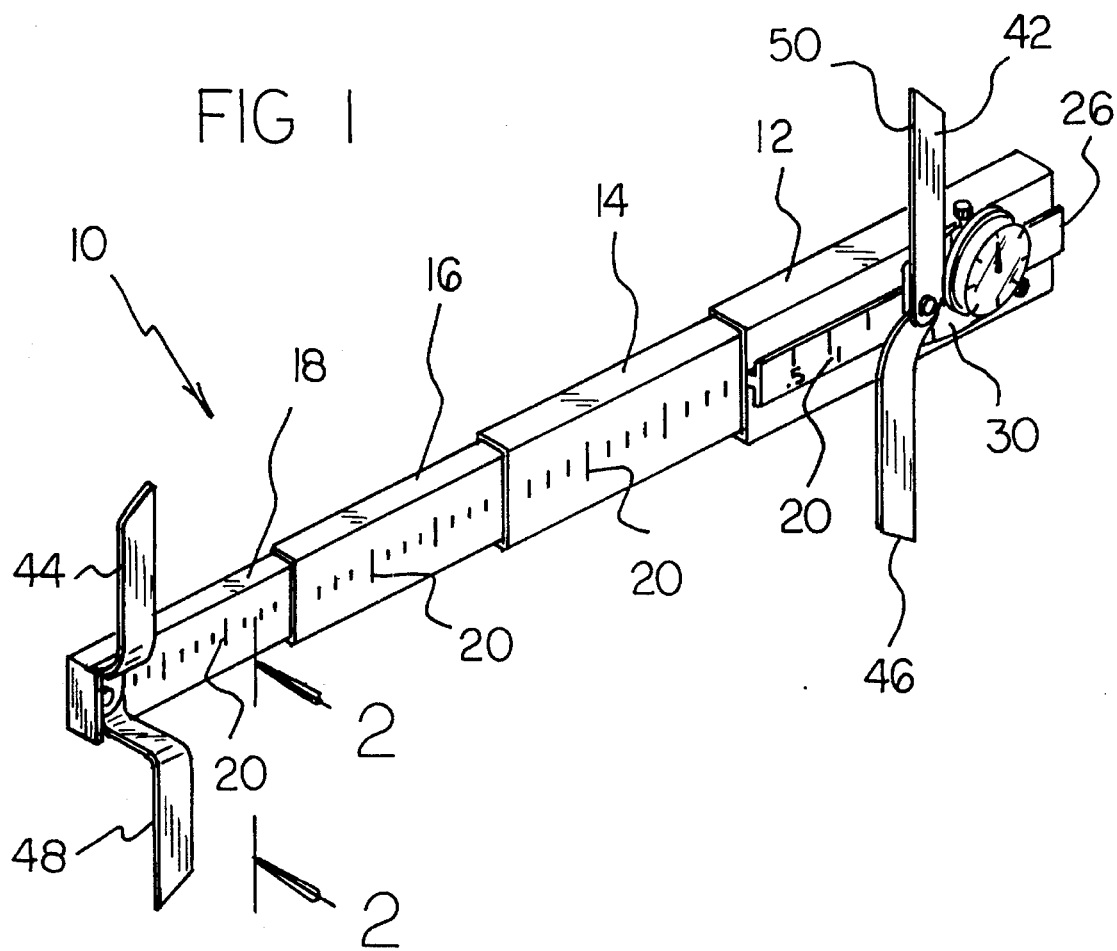

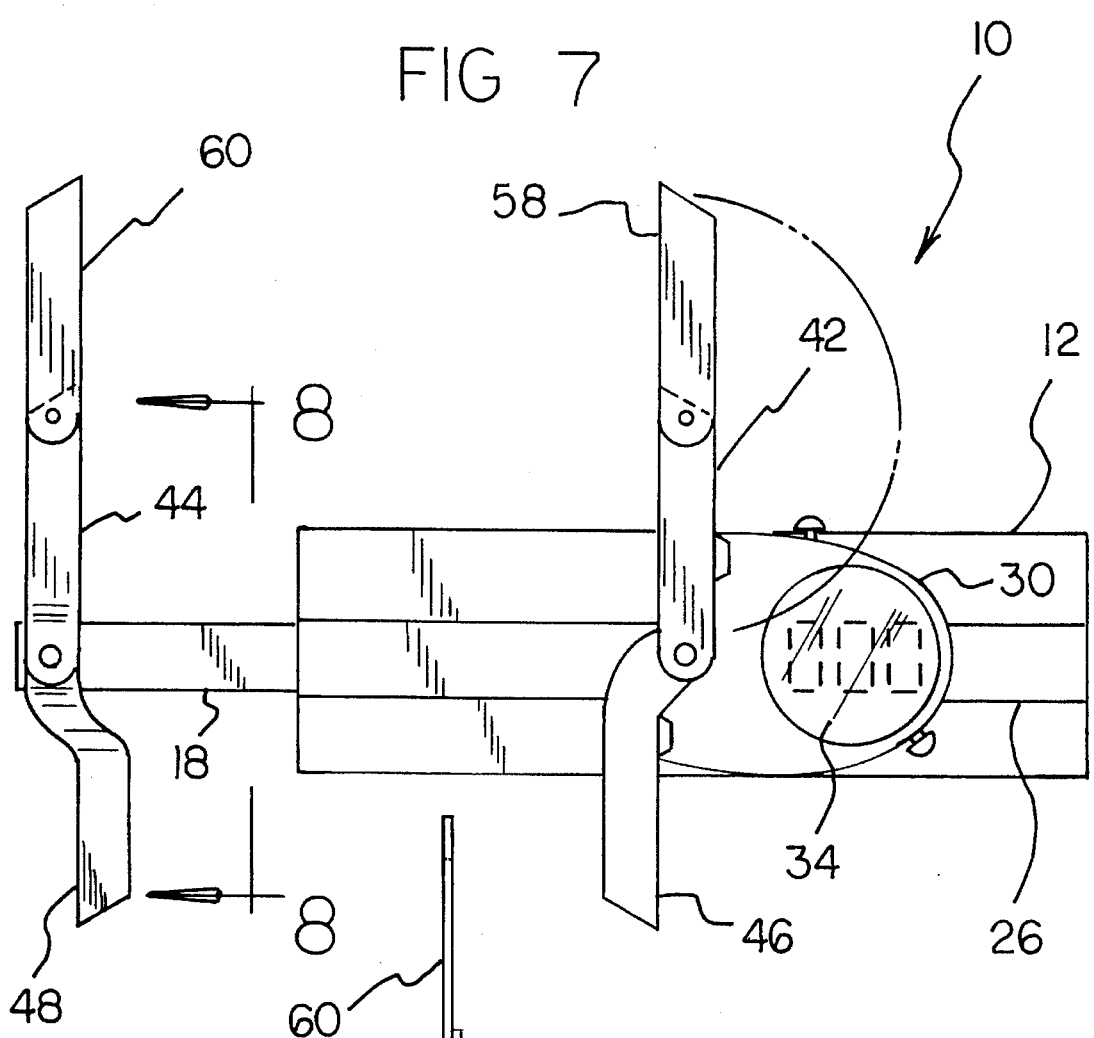
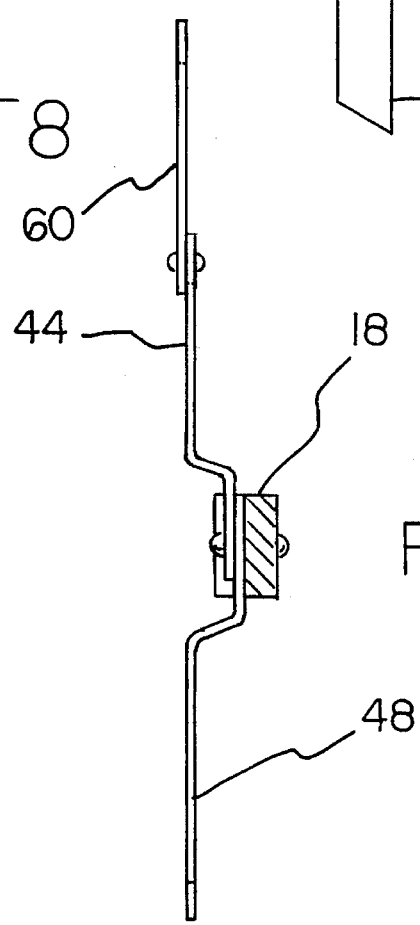

INSIDE AND OUTSIDE DIAMETER MEASURING GAUGE

BACKGROUND OF THE INVENTION

1. Field of the Invention

The present invention relates to measuring devices and more particularly pertains to a measuring gauge for measuring both inside and outside diameters.

2. Description of the Prior Art

The use of measuring devices is known in the prior art. More specifically, measuring devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art measuring devices include U.S. Pat. No. 4,188,727; U.S. Pat. No. 4,610,090; U.S. Pat. No. 4,711,037; U.S. Pat. No. 4,058,900; and U.S. Pat. No. 4,063,362.

While these devices fulfill their respective, particular objectives and requirements, the aforementioned patents do not disclose a measuring gauge for measuring both inside and outside diameters which includes a main body having a plurality of extension members telescopingly received therein, a pair of pivotally mounted OD legs operable to engage the outside surfaces of an object being measured, and a pair of pivotally mounted ID legs operable to engage the interior surfaces of the measured objects, with the OD legs and the ID legs being aligned such that indicia provided along the device can be used for both inside and outside measuring operations.

In these respects, the inside and outside diameter measuring gauge according to the present invention substantially departs from the conventional concepts and designs of the prior art, and in so doing provides an apparatus primarily developed for the purpose of measuring both inside and outside diameters of an object.

SUMMARY OF THE INVENTION

In view of the foregoing disadvantages inherent in the known types of measuring devices now present in the prior art, the present invention provides a new inside and outside diameter measuring gauge construction wherein the same can be utilized for measuring both inside and outside diameters of an object. As such, the general purpose of the present invention, which will be described subsequently in greater detail, is to provide a new inside and outside diameter measuring gauge apparatus and method which has many of the advantages of the measuring devices mentioned heretofore and many novel features that result in a inside and outside diameter measuring gauge which is not anticipated, rendered obvious, suggested, or even implied by any of the prior art measuring devices, either alone or in any combination thereof.

To attain this, the present invention generally comprises a measuring gauge for measuring both inside and outside diameters. The inventive device includes a main body having a plurality of extension members telescopingly received therein which may be extended therefrom to various lengths. The device further includes a pair of pivotally mounted OD legs operable to engage the outside surfaces of an object being measured, and a pair of pivotally mounted ID legs operable to engage the interior surfaces of the measured object. The OD legs and the ID legs are aligned such that indicia provided along the device can be used for both inside and outside measuring operations There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new inside and outside diameter measuring gauge apparatus and method which has many of the advantages of the measuring devices mentioned heretofore and many novel features that result in a inside and outside diameter measuring gauge which is not anticipated, rendered obvious, suggested, or even implied by any of the prior art measuring devices, either alone or in any combination thereof.

It is another object of the present invention to provide a new inside and outside diameter measuring gauge which may be easily and efficiently manufactured and marketed.

It is a further object of the present invention to provide a new inside and outside diameter measuring gauge which is of a durable and reliable construction.

An even further object of the present invention is to provide a new inside and outside diameter measuring gauge which is susceptible of a low cost of manufacture with regard to both materials and labor, and which accordingly is then susceptible of low prices of sale to the consuming public, thereby making such inside and outside diameter measuring gauges economically available to the buying public.

Still yet another object of the present invention is to provide a new inside and outside diameter measuring gauge which provides in the apparatuses and methods of the prior art some of the advantages thereof, while simultaneously overcoming some of the disadvantages normally associated therewith.

Still another object of the present invention is to provide a new inside and outside diameter measuring gauge for measuring both inside and outside diameters of an object.

Yet another object of the present invention is to provide a new inside and outside diameter measuring gauge which includes a main body having a plurality of extension members telescopingly received therein, a pair of pivotally mounted OD legs operable to engage the outside surfaces of an object being measured, and a pair of pivotally mounted ID legs operable to engage the interior surfaces of the measured objects, with the OD legs and the ID legs being aligned such that indicia provided along the device can be used for both inside and outside measuring operations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of an inside and outside diameter measuring gauge according to the present invention.

FIG. 2 is an enlarged front elevation illustration as viewed from line 2—2 of FIG. 1.

FIG. 7 is a front elevation view of the device including a pair of leg extensions.

FIG. 8 is a cross-section view taken along line 8—8 of FIG. 7.

DESCRIPTION OF THE PREFERRED EMBODIMENT

Figure 3:
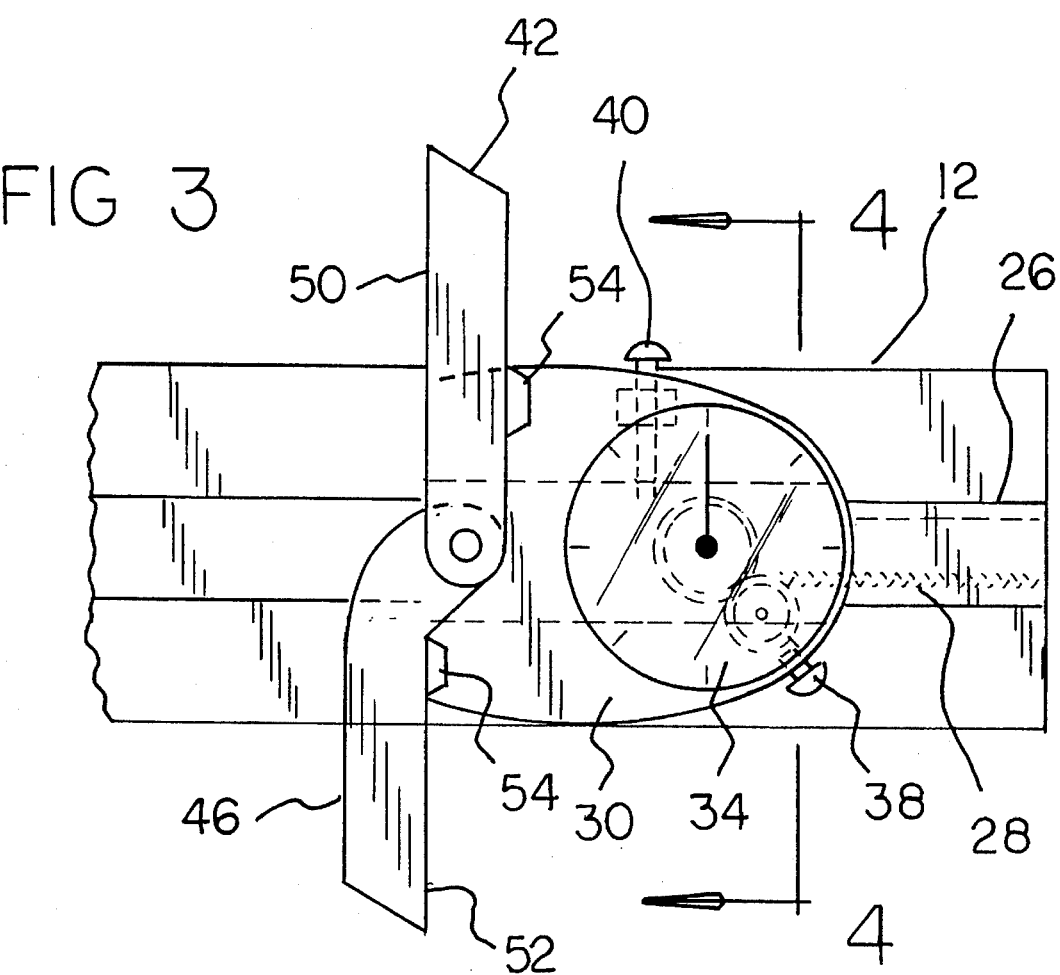
FIG. 3 is a further enlarged front elevation view of a portion of the present invention.

With reference now to the drawings, and in particular to FIGS. 1–8 thereof, a new inside and outside diameter measuring gauge embodying the principles and concepts of the present invention and generally designated by the reference numeral 10 will be described.

More specifically, it will be noted that the inside and outside diameter measuring gauge 10 comprises a main body 12 having a substantially hollow interior and being of any desired cross sectional shape, such as round or rectangular as illustrated. Preferably, the main body 12 is substantially rectangularly shaped as shown. A first extension member 14 is slidably received within the interior of the main body 12 and may be telescopingly extended therefrom as shown in FIG. 1. Similarly, a second extension member 16 is slidably received within the hollow interior of the first extension member 14, with a third extension member 18 being slidably received within the hollow interior of the second extension member. By this structure, a desired number of the extension members 14–18 may be slidably extended from the main body 12 to facilitate measuring a variety of lengths. To this end, each of the extension members 14–18 includes calibrated measuring indicia 20 cooperable with the measuring indicia 20 also provided along the main body 12.

Figure 5:
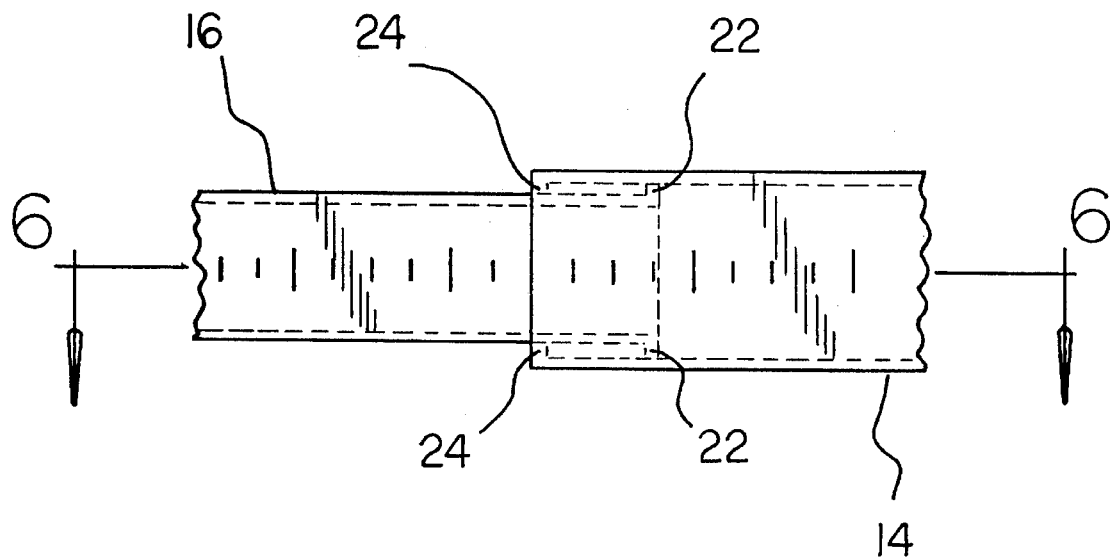
FIG. 5 is yet a further enlarged front elevation view of a further portion of the invention.
Figure 6:
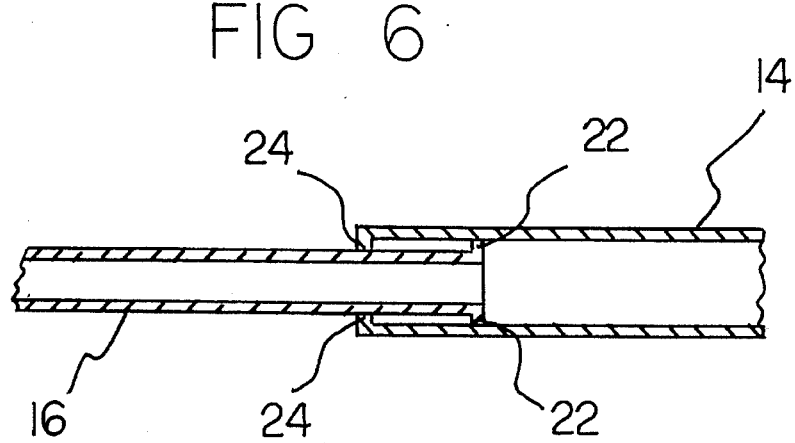
FIG. 6 is a cross-sectional view taken along line 6—6 of FIG. 5.

As best illustrated in FIGS. 5 and 6 of the drawings, it can be shown that the extension members 14–18 are telescopingly received within each other and the main body 12, and are precluded from separation by an exterior circumferential projection 22 which engages an interior circumferential projection 24. Preferably, frictional engagement between the members 14–18, as well as the main body 12, retains these extension members in a desired position. However, it is contemplated that suitable locking means may be provided for positively securing the extension members 14–18 in any relative position.

Figure 4:
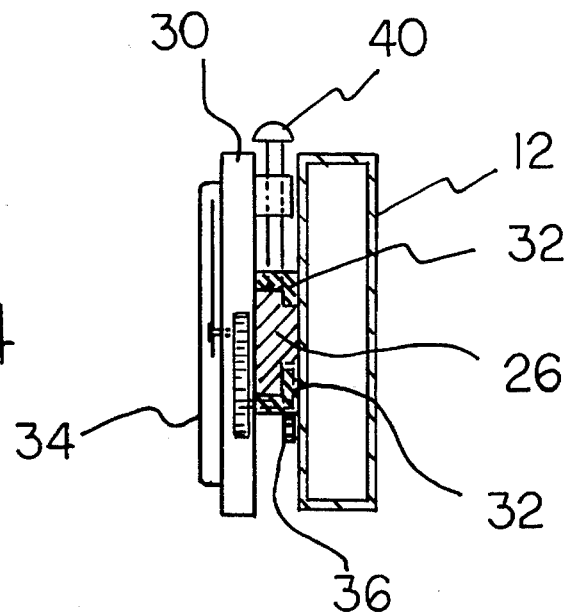
FIG. 4 is a cross-sectional view taken along line 4—4 of FIG. 3.

As best illustrated in FIGS. 3 and 4 of the drawings, the main body 12 is provided with a T-shaped member 26 which is secured to a front face of the main body and extends along a longitudinal length thereof. The T-shaped member 26 includes an integrally formed rack 28 having a plurality of unlabeled rack teeth which preferably project downward. As shown in FIG. 4, a slider 30 is movably mounted to the T-shaped member 26 by a plurality of L-shaped legs 32 which cooperate to slidably capture the T-shaped member. Thus, the slider 30 may be moved along the longitudinal length of the main body 12. A gauge 34 is mounted to the slider 30 and includes a gauge gear 36 which engages the rack teeth of the rack 28 formed along the T-shaped member 26. By this structure, movement of the slider 30 relative to the main body 12 will be registered by the gauge 34, with the gauge including suitable measurement indicia thereon cooperable with the measurement indicia 20 to provide an overall indication of length. Preferably, the gauge 34 comprises an analog gauge. However, the gauge 34 may comprise a digital gauge, such is illustrated in FIG. 7 for example. A suitable digital gauge is disclosed in U.S. Pat. No. 4,063,362 which is incorporated herein by reference. Regardless of the style of the gauge 34, the gauge is desirably provided with a dial adjustment 38 which permits calibration of the device 10. Further, the slider 30 also desirably includes a slide lock 40 which is movably mounted to the slider and may be selectively engaged to the T-shaped member 26 to selectively secure a position of the slider relative to the main body 12.

As best illustrated in FIGS. 1 through 3, the device 10 further includes first and second OD legs 42, 44, with the first OD (Outer Diameter) leg being pivotally mounted to the slider 30 and the second OD leg being pivotally mounted to an outer distal end of the third extension member 18. The first and second OD legs 42, 44 are operable to measure the outside diameter of an object during use of the device 10. In addition, first and second ID (Inner Diameter) legs 46, 48 are provided for the measurement of inside diameters, with the first ID leg 46 being pivotally mounted to the slider 30 and the second ID leg 48 being pivotally mounted to the outer distal end of the third extension member 18. Preferably, the first OD leg 42 and the first ID leg 46 are mounted to the slider 30 by a common unlabeled pivot pin, and the second OD leg 44 and second ID leg 48 are pivotally mounted to the outer distal end of the third extension member 18 by a similarly shaped unlabeled common pivot pin. By this structure, the legs 42-28 may be folded for storage, or extended as illustrated in FIG. 1 for measurement, with frictional engagement between the legs and the pivot pins serving to retain the legs in either the stowed or extended positions. In addition to the frictional engagement which retains the legs 42–48 in either the stowed or extended position, a pair of inner stop projections 54 are mounted to the slider 30, as illustrated in FIG. 3, and a single outer stop projection 56 is mounted to the outer distal end of the third extension member 18.

Referring now in detail to FIGS. 2 and 3, it can be shown that the first and second OD legs 42, 44 include inwardly facing interior surfaces 50 which cooperate to facilitate measurement of the exterior surface of an object being measured. Similarly, the first and second ID legs 46, 48 include oppositely facing exterior surfaces 52 which cooperate to facilitate measurement of the inside of the object. To permit use of the measurement indicia 20 for both inside and outside measurements, the interior surfaces 50 of the first and second OD legs 42, 44 are colinearly aligned with the exterior surfaces 52 of the first and second ID legs 46, 48.

Referring to FIGS. 7 and 8, it can be shown that the inside and outside diameter measuring gauge 10 may additionally further comprise a pair of leg extensions including a first leg extension 58 and a second leg extension 60 which are pivotally mounted to the first and second OD legs 42, 44, respectively, by a further unlabeled pivot pin. To retain the leg extensions 58, 60 relative to the OD legs 42, 44, suitable latching means such as stop projections, detent latches, or the like may be provided in addition to the frictional engagement afforded by the further pivot pins which couple the leg extensions to the OD legs. Although not specifically illustrated, it is contemplated that additional leg extensions may be provided and pivotally coupled to the ID legs 46, 48 in a manner similar to that illustrated for the OD legs 42, 44. The leg extensions 58, 60 are operable to permit measurement of otherwise unaccessible portions of an object, such as the main body of a bottle exposed only from the top end or neck area.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An inside and outside diameter instrument comprising:
   a main body having measuring indicia placed thereon;
   a slider movably coupled to said main body;
   a gauge mounted to said slider for indicating a position of said slider relative to said main body;
   first and second outer diameter legs, hereafter designated as OD legs, with said first OD leg being pivotally mounted to said slider and said second OD leg being coupled with said main body and pivotal relative to said main body, said first and second OD legs including inwardly facing interior surfaces which cooperate to facilitate measurement of an exterior surface of an object; and,
   first and second inner diameter legs, hereafter designated as ID legs, with said first ID leg being pivotally mounted to said slider and said second ID leg being coupled with said main body and pivotal relative to said main body, said first and second ID legs including oppositely facing exterior surfaces which cooperate to facilitate measurement of an inside of said object.

2. The inside and outside diameter measuring gauge of claim 1, wherein said interior surfaces of said first and second OD legs are colinearly aligned with said exterior surfaces of said first and second ID legs.

3. The inside and outside diameter measuring gauge of claim 2, wherein said main body includes a substantially hollow interior, and further comprising at least one extension member slidably received within the interior of said main body, wherein said second OD leg and said second ID leg are pivotally mounted to an outer distal end of said extension member, with said extension member having extension member measuring indicia placed thereon, said extension member measuring indicia being cooperable with said main body measuring indicia.

4. The inside and outside diameter measuring gauge of claim 3, wherein said extension member is precluded from separation from the main body by an exterior circumferential projection on said extension member which engages an interior circumferential projection within said main body.

5. The inside and outside diameter measuring gauge of claim 4, and further comprising a T-shaped member secured to a front face of said main body and extends along a longitudinal length thereof, said T-shaped member including an integrally formed rack having a plurality of rack teeth, wherein said gauge comprises a gauge gear in mesh with said rack teeth.

6. The inside and outside diameter measuring gauge of claim 5, and further comprising a pair of leg extensions including a first leg extension and a second leg extension pivotally mounted to said first and second OD legs, respectively.

7. The inside and outside diameter measuring gauge of claim 6, wherein said gauge comprises an analog gauge.

8. The inside and outside diameter measuring gauge of claim 6, wherein said gauge comprises a digital gauge.

9. An inside and outside diameter measuring instrument comprising:
   a main body having measuring indicia placed thereon, said main body including a substantially hollow interior;
   a first hollow extension member slidably received within said interior of said main body, said first extension member having first extension member measuring indicia placed thereon, said first extension measuring indicia being cooperable with said main body measuring indicia, wherein said first extension member is precluded from separation from said main body by an exterior circumferential projection on said first extension member which engages an interior circumferential projection within said main body;
   a second hollow extension member slidably received within said first extension member, said second extension member having second extension member measuring indicia placed thereon, said second extension measuring indicia being cooperable with said main body measuring indicia, wherein said second extension member is precluded from separation from said first extension member by an exterior circumferential projection on said second extension member which engages an interior circumferential projection within said first extension member;

a third extension member slidably received within said second hollow extension member, said third extension member having third extension member measuring indicia placed thereon, said third extension measuring indicia being cooperable with said main body measuring indicia, wherein said third extension member is precluded from separation from said second extension member by an exterior circumferential projection on said third extension member which engages an interior circumferential projection within said second extension member;

a T-shaped member secured to a front face of said main body and extending along a longitudinal length thereof, said T-shaped member including an integrally formed rack having a plurality of rack teeth;

a slider movably coupled to said main body;

a gauge mounted to said slider for indicating a position of said slider relative to said main body, said gauge including a gauge gear in mesh with said rack teeth;

first and second outer diameter legs, hereafter designated OD legs, with said first OD leg being pivotally mounted to said slider and said second OD leg being coupled to said third extension member and pivotal relative thereto, said first and second OD legs including inwardly facing interior surfaces which cooperate to facilitate measurement of an exterior surface of an object; and, first and second inner diameter legs, hereafter designated ID legs, with said first ID leg being pivotally mounted to said slider and said second ID leg being coupled to said third extension member and pivotal relative thereto, said first and second ID legs including oppositely facing exterior surfaces which cooperate to facilitate measurement of an inside of said object, wherein said interior surfaces of said first and second OD legs are colinearly aligned with said exterior surfaces of said first and second ID legs.

10. The inside and outside diameter measuring gauge of claim 9, and further comprising a pair of leg extensions including a first leg extension and a second leg extension pivotally mounted to said first and second OD legs, respectively.

11. The inside and outside diameter measuring gauge of claim 10, wherein said gauge comprises an analog gauge.

12. The inside and outside diameter measuring gauge of claim 10, wherein said gauge comprises a digital gauge.

* * * * *